(12) United States Patent
Piccolo et al.

(10) Patent No.: US 8,880,244 B2
(45) Date of Patent: Nov. 4, 2014

(54) METHOD FOR EVALUATING THE STRUCTURAL COMPATIBILITY OF AN AIRCRAFT FOR USE ON ROUGH RUNWAYS

(71) Applicant: Alenia Aermacchi S.p.A., Venegono Superiore (IT)

(72) Inventors: Antonio Piccolo, Naples (IT); Gaetana Mastroianni, Frignano (IT); Sandro Migliore, Naples (IT)

(73) Assignee: Alenia Aermacchi S.p.A., Venegono Superiore (IT)

( * ) Notice: Subject to any disclaimer, the term of this patent is extended or adjusted under 35 U.S.C. 154(b) by 0 days.

(21) Appl. No.: 13/849,136

(22) Filed: Mar. 22, 2013

(65) Prior Publication Data

US 2013/0289803 A1    Oct. 31, 2013

(30) Foreign Application Priority Data

Mar. 27, 2012  (IT) .............................. TO2012A0277

(51) Int. Cl.
   *E01C 9/00*    (2006.01)
   *G01B 21/30*   (2006.01)
   *G08G 5/00*    (2006.01)

(52) U.S. Cl.
   CPC . *E01C 9/00* (2013.01); *G01B 21/30* (2013.01); *G08G 5/00* (2013.01)
   USPC .......................................................... 701/3

(58) Field of Classification Search
   CPC ........ G01C 23/00; G01C 5/065; G01C 99/00; G01C 5/0026
   USPC ............... 701/3, 10, 16, 80; 244/114 R, 119, 244/117 R, 1 R
   See application file for complete search history.

(56) References Cited

U.S. PATENT DOCUMENTS

| | | | |
|---|---|---|---|
| 7,437,250 B2 * | 10/2008 | Breen et al. ..................... | 702/34 |
| 2005/0172526 A1 * | 8/2005 | Taylor et al. .................... | 37/466 |
| 2008/0015743 A1 * | 1/2008 | Haug ................................ | 701/1 |
| 2012/0253763 A1 * | 10/2012 | Herbstreit ........................ | 703/6 |
| 2013/0127642 A1 * | 5/2013 | Maggiore et al. ............. | 340/947 |

OTHER PUBLICATIONS

Geradi, Anthony G., "Dynamic Response of Aircraft to Pavement Unevenness", 1978, (see Abstract).*
Griffis, F. H. and Gamon, M. A., "Aircraft-Pavement Compatibility Study", 1974, (see Abstract).*

* cited by examiner

*Primary Examiner* — Mary Cheung
*Assistant Examiner* — Rodney Butler
(74) *Attorney, Agent, or Firm* — Gottlieb, Rackman & Reisman, P.C.

(57) ABSTRACT

A method for evaluating the structural compatibility of an aircraft for use on a runway having a profile with one or more roughnesses in the form of bumps and/or dips using a computer-based system, and including the steps of: generating a first bump height curve representing elevations or depressions on the runway; comparing the bump height curve with a second bump height curve which is a first reference curve; generating a first power spectral density curve of the profile of the runway; comparing the first power spectral density curve with a second power spectral density curve which is a second reference curve; and authorizing or denying the aircraft the use of the runway on the basis of results of the comparison.

10 Claims, 9 Drawing Sheets

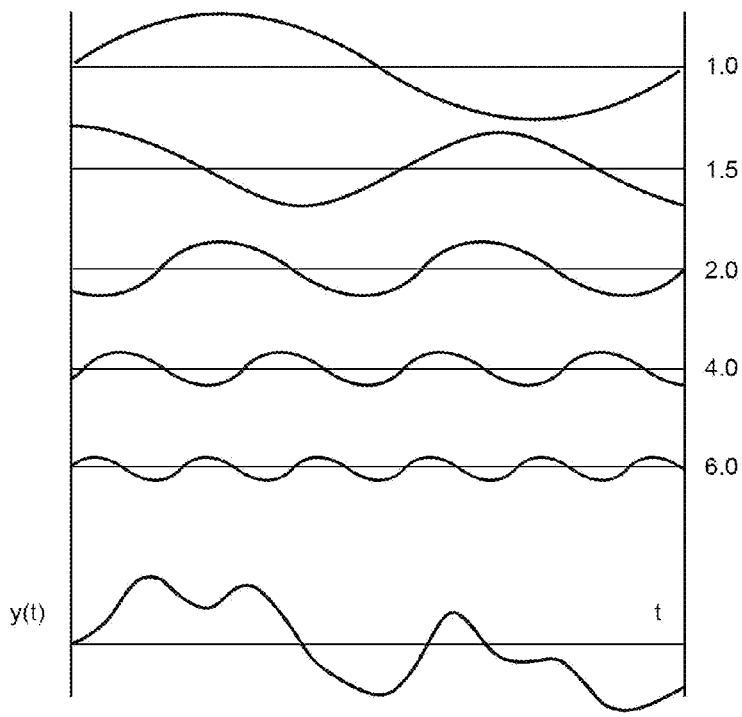
FIG. 7a
FIG. 7b
FIG. 7c
FIG. 7d
FIG. 7e
FIG. 7f
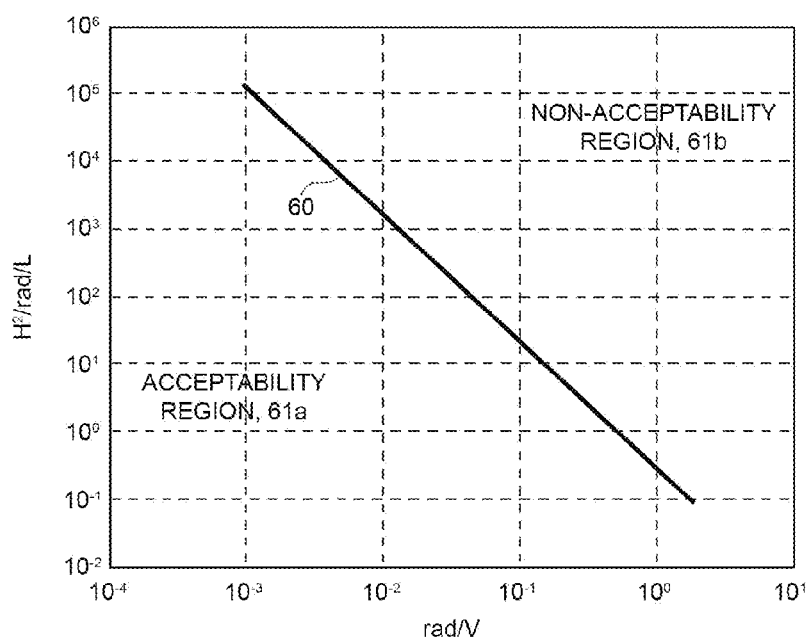
FIG. 8

METHOD FOR EVALUATING THE STRUCTURAL COMPATIBILITY OF AN AIRCRAFT FOR USE ON ROUGH RUNWAYS

The present invention relates to a method for evaluating the structural compatibility of an aircraft for use on rough runways.

BACKGROUND OF THE INVENTION

Taxiing operations on runways that are unpaved or, in general, have roughnesses that could represent critical situations for numerous components of modern aircraft, due to the stresses that these roughnesses transmit to the wheels, shock absorbers and structure of the aircraft as a whole.

In general, the surfaces of runways, especially those of the more important civil airports are made as "level" as possible, controlled and maintained at regular intervals to a level of surface finish considered acceptable by the airport operators. In smaller airports where the take-off/landing runways are built on dirt/gravel, the surface finish does not always have the same degree of levelling. In addition, the length of the runways is such that it is virtually impossible to assume a completely "levelled" surface. The stresses transmitted to the aircraft from taxiing on rough runways must be evaluated both from the viewpoint of the strength limit (i.e. no permanent deformation or breakage must occur due to exceeding the design loads) and from the viewpoint of fatigue on the primary and secondary structures of the aircraft.

In general, when defining the roughness of a runway, it is necessary to distinguish between macro-roughness like bumps or dips, whether located in isolation from one another (for example, located at distances from each other significantly greater than the length of the aircraft), or mutually consecutive (i.e. located close to each other, for example, at a distance approximately half the length of the aircraft or less), and micro-roughness for which one talks more properly of surface roughness. Generally speaking, it can be asserted that surface roughness is the type of asperity that, for the most part, can only cause damage to the tyres of the wheels, first of all causing precocious wear. Instead, the bumps/dips represent variations in runway height, which can be either abrupt or gradual with respect to the measured profile of the runway considered, and which, depending on the aircraft's taxiing speed, the length of the roughnesses and their height, generate stresses that the shock absorbing systems cannot always sufficiently contain. In this case, stresses induced by the above-stated roughnesses are transmitted to the rest of the aircraft's cell that, in addition to reducing passenger comfort, can cause damage both due to exceeding the design limit loads and due to the development of vibrations (in any case, to be investigated to exclude the triggering of resonance phenomena with the structure's intrinsic frequencies), as well as an increase in structural fatigue with respect to the case of using an (ideally) smooth runway.

Generally speaking, the known methods of runway roughness analysis are focused on defining the acceptable level of surface roughness for all commercial aircraft that must perform take-off/landing/taxiing operations on the given runway (in order to assess comfort on board the aircraft and to maximize the working life of the aircraft itself and its components, such as the undercarriage for example). These methods therefore provide a useful evaluation of the runway for airport authorities to control the state and maintenance of the runway.

SUMMARY OF THE INVENTION

The object of the present invention is to provide a method for evaluating the structural compatibility of an aircraft for use on rough runways, and such as to enable evaluating the intrinsic structural capability of the aircraft considered for use on a given runway. In particular, the object of the present invention is to provide a method for evaluating the structural compatibility of an aircraft for use on rough runways that enables rapid analysis of structural compatibility in the design and development phases and is such as to be easily integrated into the design and development phases in order to control structural changes so as to meet specific structural compatibility requirements.

According to the present invention, a method for evaluating the structural compatibility of an aircraft for use on rough runways is provided as defined in the appended claims.

In particular, according to the present invention, a method is provided for evaluating the structural compatibility of an aircraft (2) for use on a runway having a profile with one or more roughnesses in the form of bumps and/or dips, comprising the steps of:

generating a first equivalent bump height curve indicative of the elevation and/or depression of the one of more roughnesses of the runway with respect to a reference value;

comparing the first equivalent bump height curve with a second equivalent bump height curve indicative of elevation and/or depression limit values of reference roughnesses such that, when the aircraft encounters said reference roughnesses, the stresses transferred to the structure of the aircraft or parts thereof are lower than a first acceptable limit load, the second equivalent bump height curve moreover defining a first acceptability region and a first non-acceptability region of said stresses transferred when the aircraft encounters said reference roughnesses;

generating a first power spectral density curve by means of spectral analysis of the profile of the runway;

comparing (107) the first power spectral density curve with a second power spectral density curve relating to a profile of a reference runway such that, when the aircraft runs along said reference runway, the stresses transferred to the structure of the aircraft or parts thereof are lower than a second admissible limit load, the second power spectral density curve moreover defining a second acceptability region and a second non-acceptability region of said stresses transferred when the aircraft runs along the reference runway;

verifying if the first equivalent bump height curve develops entirely within the first acceptability region and if the first power spectral density curve develops entirely within the second acceptability region; and on the basis of the result of said step of verifying, authorizing or denying the aircraft the use of the runway.

BRIEF DESCRIPTION OF THE DRAWINGS

For a better understanding of the present invention, some preferred embodiments will now be described, purely by way of non-limitative example and with reference to the attached drawings, where:

FIGS. 7a-7e show sinusoidal signals with which it is possible to obtain, by superimposition, a runway profile of the type shown in FIG. 7f, including macro-roughnesses of the bump/dip type;

FIG. 7f shows an example of a runway profile obtained through the superimposition of sinusoidal signals of the type shown in FIGS. 7a-7e;

FIG. 8 shows, on a logarithmic scale, the straight line representing the linear interpolation in a least squares sense of the logarithm of the power spectral density (PSD) curve relating to a runway profile taken as reference for a given aircraft;

DETAILED DESCRIPTION OF THE INVENTION

Figure 1:
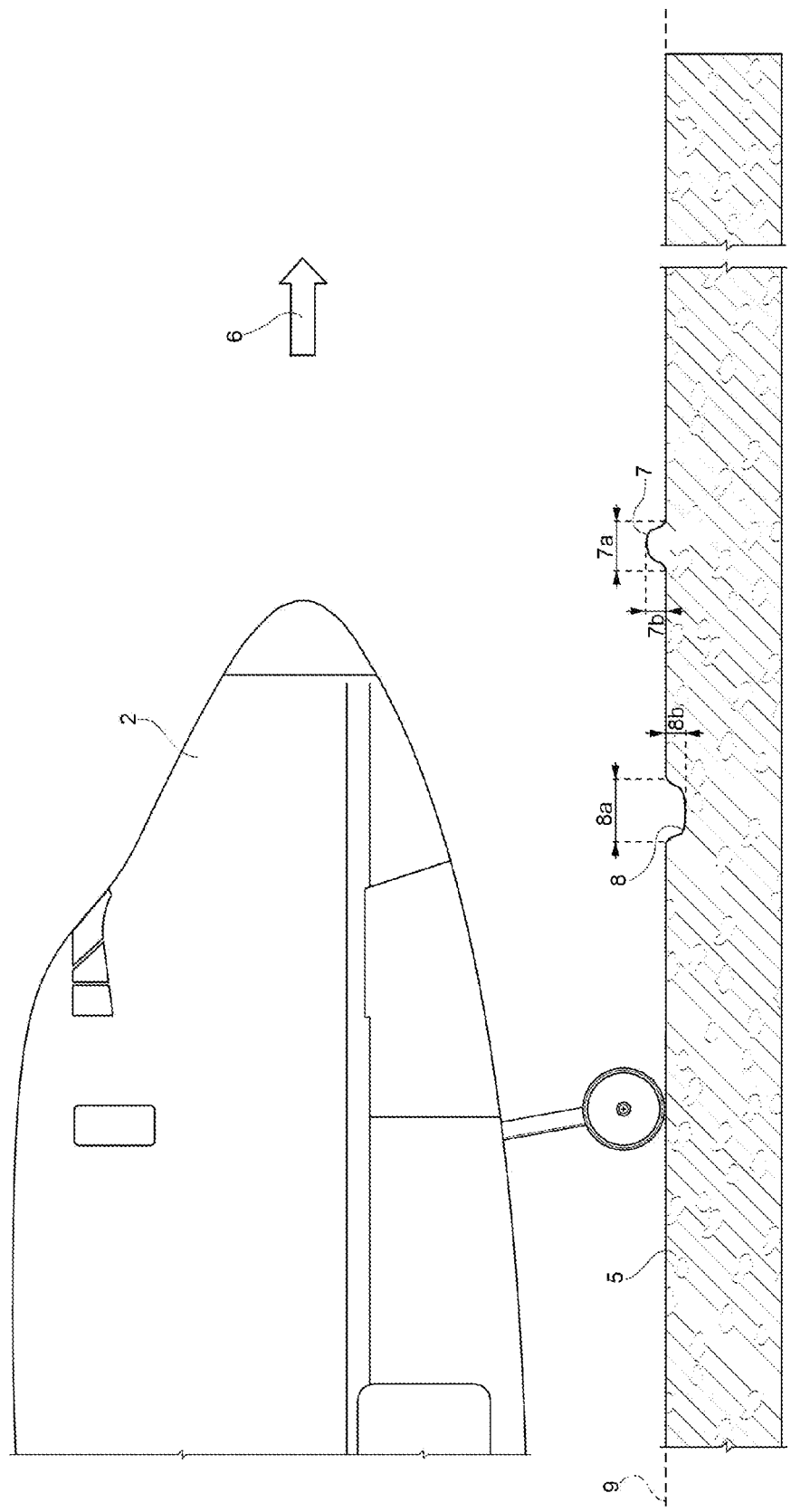
FIG. 1 schematically shows a rough taxiing/take-off/landing runway.

It is known that significant variations in the profile of a take-off/landing runway can increase stress on the components of the aircraft, reduce the aircraft's braking action, create problems in reading onboard instruments for pilots and/or cause discomfort to passengers. Typically, roughness in the form of bumps or dips extending along the runway for a significant portion thereof can be present, yet are unlikely to be identified by an operator with the naked eye. Other types of roughness can instead be characterized by small spatial extension, but have considerable depth or height with respect to an ideal flat line extending along the runway. All of these types of roughness can be characterized according to their length and height with respect to a reference (the reference is, for example, the desired plane on which the runway should lie).

In this context, it is understood that the term "length" means the spatial extension of the roughness considered when measured along an ideal rectilinear direction parallel to the direction of extension of the runway; the direction of extension of the runway is, for example, the direction along which the aircraft moves when it travels along the runway.

In this context, it is understood that the term "height" means the maximum spatial extension of the roughness considered when measured along an ideal rectilinear direction orthogonal to the direction of extension of the runway. The "height" can have positive values, indicative of a bump, and negative values, indicative of a dip. This obviously depends on the reference considered as the point of zero height. For example, the point of zero height could be coincident with an ideal base plane of the runway, corresponding to the upper surface of the runway and chosen each time as needed. Alternatively, the "height" could take just positive values (in this case, the zero reference is chosen at the end of the measuring process as the lowest point reached by the roughnesses, i.e. in the deepest dip). As another alternative, the height could be considered as an absolute value. In any case, it is clear that the "zero" reference used for calculating the height of each roughness can be chosen freely and in an arbitrary manner. It is common practice to take the first measurement point on the runway as "zero" for the runway profile (as a rule, coincident with the one that in practice is the operational starting point or "beginning" of the runway). Alternatively, "zero" for the runway profile is taken as the first measurement having a maximum (or minimum) value.

To identify the "length" of a roughness, reference can be made to the distance between a point considered to be the roughness start point and another point considered to be the roughness end point (in this case, one talks of "wavelength"). In the same way, one can also talk of "bump/dip length" as the distance between the roughness start (or end) point and the point of maximum deviation (considered as the absolute value of the maximum height reached). In this case, the point of maximum deviation is considered to be lying on the ideal straight line that connects the roughness start point with the roughness end point. If the roughness is symmetrical, the wavelength is equal to twice the bump/dip length; if the roughness is not symmetrical, then the bump/dip length is the smaller of the distances between the point of maximum deviation and the roughness start and end points. For the definition of the start and end points, it can be assumed that the start point of each roughness is the point where the surface of the runway reaches a height exceeding a certain threshold (the threshold can be a few millimeters or a few centimeters), while the end point of the roughness is the point where the surface of the runway reaches the previous height again.

Naturally, the same process can be used for measuring smaller roughnesses, having smaller spatial extensions, and present inside a roughness of greater spatial extension (i.e. within the length of extension of the roughness of greater length).

FIG. 1 shows, by way of example, a runway 5 extending along a direction of extension 6. An aircraft 2 is shown on the runway 5, while performing a taxiing operation along the direction of extension 6. The runway 5 has roughnesses in the form of a bump 7 and a dip 8. The bump 7 has a length 7a, measured as previously indicated, and a positive height 7b, this also measured as previously indicated with respect to a base plane 9 of the runway 5. The dip 8 has a length 8a, measured as previously indicated, and a negative height 8b, this also measured as previously indicated with respect to the base plane 9 of the runway 5.

From a mathematical standpoint, it makes sense to describe an isolated symmetrical roughness with a sinusoidal law, "1−cos(x)" (read as "one minus cosine"), characterized by a wavelength WL and a bump height BH, or height of elevation/depression. The critical elevation, or critical height/depression, of a bump/dip is defined as that for which an aircraft running over this bump/dip is subjected to stress that results in exceeding (even in just a point or limited region) the admissible design loads (or limits).

In this context, an admissible load defines a system of forces applied to a structure (in particular, an aircraft in this case) which can give rise to deformation (of a temporary nature with elastic return or permanent, plastic deformation) or even just stress on the structure (considered as a rigid structure). An admissible load is a concentrated or distributed load that can be applied on a structure without causing loss of functionality. This can be calculated starting from a breaking load (also known as the ultimate load), opportunely reduced by means of a safety coefficient (maximum admissible load). Similarly, instead of the admissible load, one can refer to a "limit load" (or also "limit state"), defined as the highest one that emerges from the envelope of all possible usage conditions of the structure provided for by the constructor on the basis of specific design requirements and/or certification standards (which in the aeronautical field include, for example, JAR, FAR, EASA and MIL). For example, the limit load is the one at which a condition is reached wherein the structure under consideration or one of its constituent elements no longer meets the requirements for which it has been designed.

The threshold chosen for the definition of "critical elevation" is typically conservative and lower than that for which the aircraft is subjected to real damage, such as, for example, deformation/breakage of a shock absorber or deformation/breakage of other parts of the undercarriage system, or also the development of forces linked to local accelerations induced by the dynamic response of the entire aircraft that are higher than those considered in its cell design/sizing phase.

Figure 2:
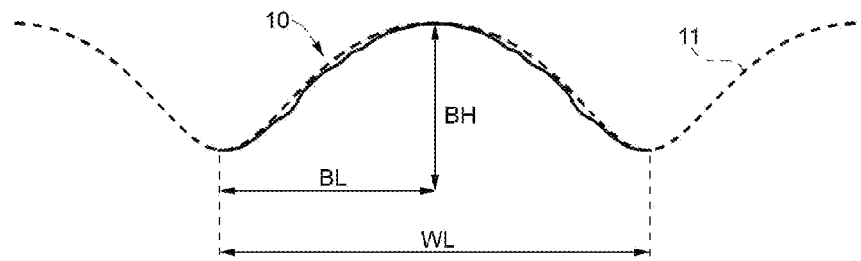
FIG. 2 shows an enlarged detail of a roughness of the runway in FIG. 1, where the roughness is mathematically approximated by a harmonic function.

FIG. 2 shows, by way of example, a profile of a portion of a runway where a roughness 10 is identified by a wavelength value WL (or longitudinal amplitude measured from roughness start to end) and a bump height BH. The profile in FIG. 2 can be described with a sinusoidal function (or harmonic function). The value BL is chosen as the distance between the start of the roughness and the point of maximum bump height BH, or the distance between the end of the roughness considered and the point of maximum bump height BH. In the case of a symmetrical roughness, BL is equal to WL/2.

Figure 3A:
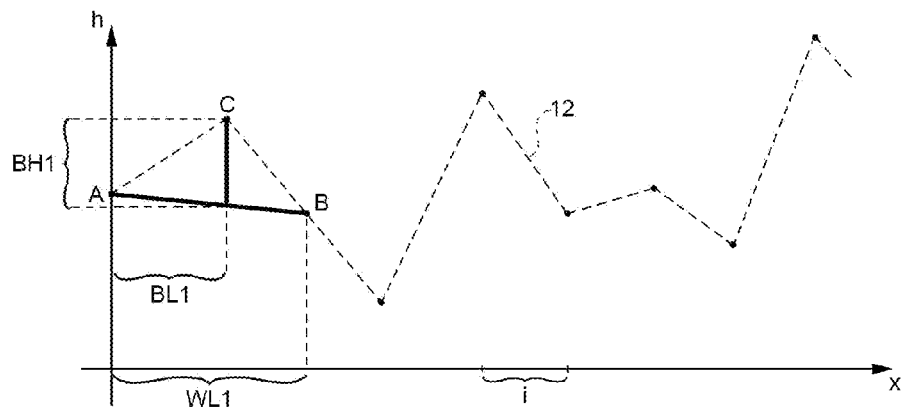
FIGS. 3a-3c shows roughness profiles of a runway and a method to calculate the equivalent wavelength and amplitude values for each roughness considered.
Figure 3B:
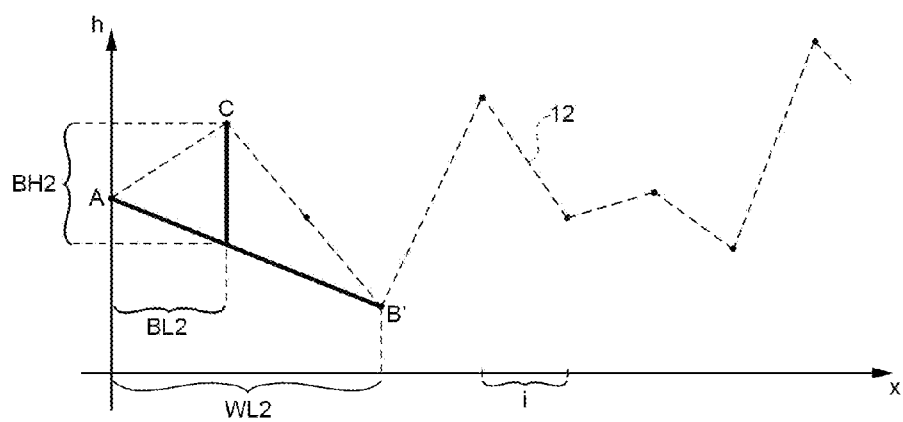
Figure 3C:
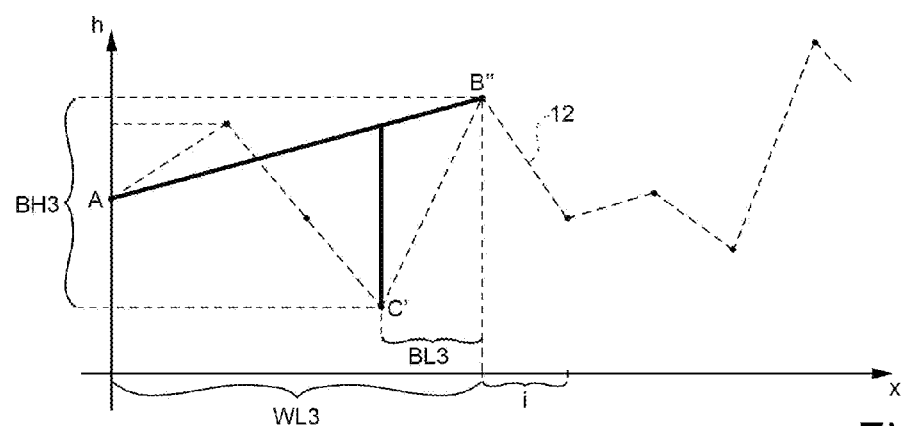

FIGS. 3a-3c show examples of elevation (or height) measurements BH1-BH3 for the different wavelengths WL1-WL3 considered, with respect to a same runway profile 12. Profile 12 can be obtained by measuring points on the centre line of the runway considered that are mutually equidistant by an amount "i", chosen as needed (e.g., "i" in the range between a few centimeters and a few meters, for example i=0.5 m). This approach is known and is described in a document by Boeing Commercial Airplane Group, nr. D6-81746, entitled "Runway Roughness Measurement, Quantification and Application—The Boeing Method".

With reference to FIGS. 3a-3c, the "Boeing Method" contemplates a recursive process of defining a virtual straightedge between two points A and B, freely chosen on the longitudinal elevation profile 12 of the runway, and measuring the maximum deviation between this virtual straightedge and a further point C lying on the surface of the runway and included between the above-mentioned points A and B (FIG. 3a). The extension, measured on the axis of abscissas (x-axis in FIG. 3a), of this virtual straightedge is the value of the wavelength (WL1 in FIG. 3a) associated with the roughness considered; the extension, measured on the axis of ordinates, of the maximum deviation is the height/depth value (BH1 in FIG. 3a) of the roughness considered.

Then, a wavelength (WL1-WL3) value and a height/depth (BH1-BH3) value are associated with each pair of points (A-B; A-B'; A-B"), having a minimum distance equal to at least twice "i" and a distance progressively incremented by "i". The process is iterative and continues until all of the possible combinations of points have been evaluated in terms of measuring the respective wavelength WL (or bump/dip length—BL) and bump height BH values. It is clear that the iterative procedure can be interrupted when desired, even before all possible combinations of the points have been evaluated in terms of measuring the respective wavelength WL and bump height BH values. For example, this is legitimate when the runway profile is devoid of significant roughnesses for one or more portions considered in its main extension, and so measuring the heights of the roughnesses would not result in changes to the curve being constructed.

The pairs of values WL (or BL) and BH measured in this way are saved in a computer memory: based on the maximum values obtained for BH (in absolute values, and therefore in the case of a dip, its depth will be assumed positive, just like the height of a bump) associated with each respective wavelength WL (or BL) value, it is possible to trace a curve that is indicative of the roughness that characterizes the runway.

Figure 4:
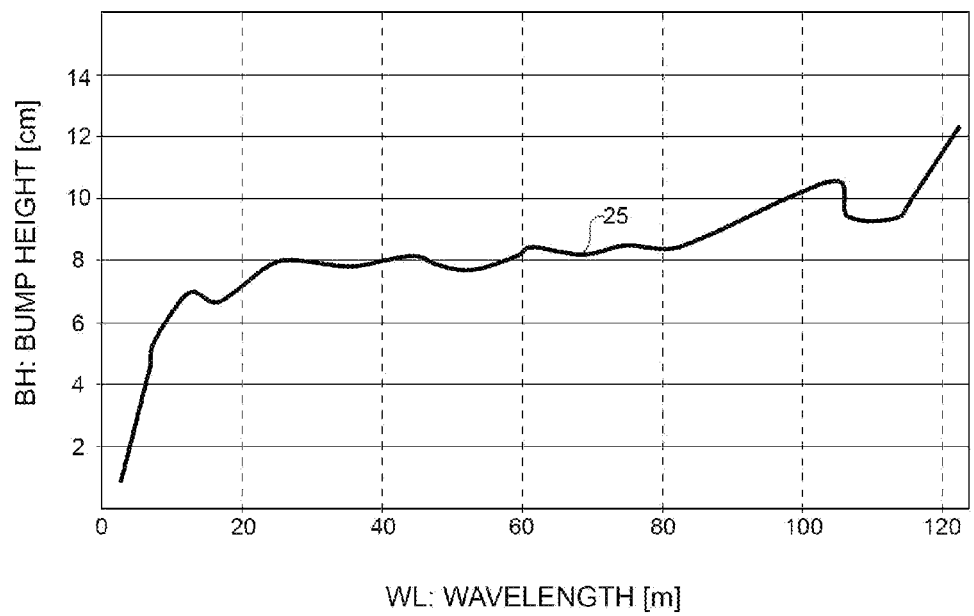
FIG. 4 shows a curve with the maximum values of deviation (heights/depressions) of the bumps/dips for each wavelength/roughness length value for a runway to be evaluated.

Such a curve is called an equivalent bump height curve (EBH); an example of an EBH curve is shown in FIG. 4 and is indicated by reference numeral 25.

It has been verified that, at normal taxiing speeds, roughnesses with wavelength WL values greater than 120 meters do not generate stress in terms of dynamic response of the aircraft, and therefore wavelengths up to 120 m (and with them, the "virtual straightedges") are considered for calculating the EBH curve. Nevertheless, if necessary, it is possible to consider values above 120 meters.

According to the present invention, a curve 25, similar to that shown in FIG. 4, is generated for each runway that it is wished to evaluate (in terms of maximum height BH in relation to its wavelength WL—or bump length BL).

Just the EBH curve is not sufficient to characterize a runway for which the surface profile is known (i.e. measured), as the above-stated curve provides at most an indication of the maximum roughnesses present (heights of the bumps and depths of the dips), but says nothing regarding how many there are or their "distribution" along the entire extension of the runway. To take this into account, according to the present invention, recourse is made to analysis of the runway profile, using power spectral density (PSD) analysis.

A measured runway profile can be likened to a random process y(t) such as that shown in FIG. 7f, a function of dependent variable t (in this specific case, t corresponds to the distance of the point of the runway profile y(t) from the origin). Such a random process can be considered as generated by the superimposition of a theoretically infinite number of sinusoidal components (shown, by way of example, in FIGS. 7a-7e with a finite number). This mathematical approach is known in mathematics as Fourier series development. As is known, evaluating the power spectral density (PSD) provides a complete measurement of the frequency content of a random process and also enables obtaining a measurement of the amplitude of each of the sinusoids in FIGS. 7a-7e.

According to the present invention, the profile of each runway to be characterized by means of PSD is found, as previously stated, by measuring roughness, in the form of bumps or dips on the runway, with a data acquisition step equal to approximately 0.5 meters, along the direction of extension of the runway, in particular on the centre line of the runway (corresponding, on average, to the path followed by the auxiliary, front or rear undercarriage of the aircraft during taxiing).

Based on the profile of the runway acquired in this way, PSD analysis is carried out by means of opportune software, or in any other known manner.

To facilitate successive steps of comparison between PSD curves, the spectral density curve obtained is transformed into a natural logarithm and linearly interpolated with the least squares method. In this way, in a diagram with a logarithmic scale, the result of PSD analysis of a runway for which the profile measured with sampled data has been supplied, translates into a straight line of the type shown in FIG. 9 and identified by reference numeral 62.

Figure 9:
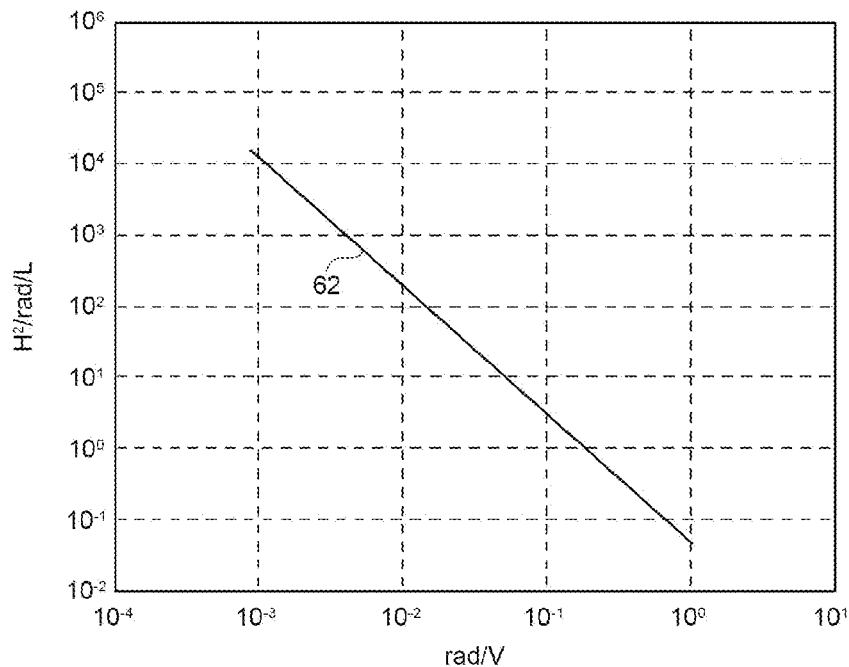
FIG. 9 shows, on a logarithmic scale, the straight line representing the linear interpolation in a least squares sense of the logarithm of the power spectral density relating to a profile of the runway to be evaluated.

With reference to FIG. 9, the axis of abscissas is in rad/V and the axis of ordinates is in $H^2/rad/L$. In this context, V represents the unitary speed for travelling along the runway of length L, the profile of which has been approximated with a Fourier series development of harmonic functions, the sum of squares of the amplitudes of which is $H^2$.

The characterization of the runways for which it wished to evaluate compatibility with the aircraft 2 concludes with the construction of the EBH (FIG. 4) and linearized PSD (FIG. 9) curves.

The above-stated EBH 25 and PSD 62 curves are compared with respective EBH (FIG. 5) and PSD (FIG. 8) reference curves that characterize the behaviour of the aircraft 2, and which are constructed as described below.

The reference EBH curve for the aircraft 2 is generated through dynamic analysis (virtual, carried by simulation software for example) of the aircraft 2 taxiing on "ideal" runways, where only one roughness in the form of a bump or dip is present each time, having variable wavelength and height (depression, in the case of a dip). In particular, for each fixed roughness length (WL or BL), the deviation (height or depression) is increased up to a value at which the acceptable limit loads are reached in some part of the aircraft (starting from the undercarriage to the entire wing cell, tail units, fuselage, engine pods and respective engines, etc.). The aircraft 2 is considered in various mass configurations (characterized by weight, centring and moments of inertia), starting from the minimum weight and up to the maximum weight, with amounts of fuel from minimum to maximum tank capacity, and each case is examined with increasing taxiing speeds from a significant minimum (10 m/s on average) up to the maximum speed corresponding to that of take-off rotation. Other aspects that, according to embodiment, are taken into consideration in the taxiing simulation are one or more of the following: i) the coefficient of friction between the tyres with which the aircraft is equipped and the ground considered (dependent on the material forming the runway, e.g. earth, grass, cement or something else); ii) the presence of aerodynamic forces and aerodynamic lift in particular; iii) the mechanical behaviour of the airframe, comprising fuselage and wings in "rigid" or "elastic" modes; iv) the mechanical behaviour of members integrated and/or coupled to the undercarriage frame (such as the deformation capability of the tyres, the travel of the shock absorbers as a function of the forces applied to them, and the rigidity and elasticity of the undercarriage frame).

Other elements can be taken into consideration, on the basis of special requirements or characteristics of the aircraft 2 considered.

This dynamic analysis of taxiing can be carried out with computer-aided simulation performed by design software, finite element analysis software, or other software, again of known type.

For example, by means of computer simulations, it is possible to simulate the consequences of stresses on single and multiple structural components of the aircraft due to roughnesses having a particular wavelength value WL and variable height values BH, to verify the response of the structural component stressed in this way to a plurality of roughnesses considered. Then, with a set wavelength value WL, the height value BH is increased in predetermined steps, starting from a minimum BH value, for example, a few mm or less, up to reaching a BH value that causes the breakage of or serious damage to the structural component considered. In this way, a pair of WL-BH limit values is obtained. The effect on the aircraft of a roughness having a greater wavelength than the previous one, for example, by increasing the WL value by a few centimeters (e.g., 0.5 m), is then evaluated. For this next wavelength WL, a simulation of the stresses sustained by the aircraft (or its components) as the height value BH changes (from minimum BH, for example, a few mm or less) up to reaching a maximum value corresponding to one or more points of the aircraft exceeding the reference conditions that define structural integrity (for example, causing the breakage of or damage to the component considered). A further pair of WL-BH limit values is thus obtained and then the procedure is reiterated until the maximum significant wavelength is considered.

Some, or all, of these phenomena excite different structures of the aircraft 2 at a certain frequency, in particular the undercarriage, and are critical conditions for the working life of the aircraft 2. The evaluation of the effect of roughnesses, having their own wavelength WL values and respective variable height values BH, on the undercarriage and portions of the aircraft 2 directly or indirectly coupled to the undercarriage during the phase of contact between the tyres and the ground and during the successive phases of "spin up" and "spring back", is a further test that can be performed.

With one, a few or all of the assumptions made up to this point, analysis of the stress to which one or more of the above-mentioned components of the aircraft are subjected provides an evaluation of the response of these components to the different stresses. For each wavelength value WL considered, the maximum height value BH regarded as the "limit" value is the one for which at least one of the components considered and subjected to simulation/test has been significantly damaged. Damage is deemed significant according to the guidelines that are decided each time. For example, the complete or partial breaking of one of the components considered, a permanent deformation or a maximum deformation limit with elastic return, or even a drop in operational efficiency can be considered significant damage.

Figure 5:
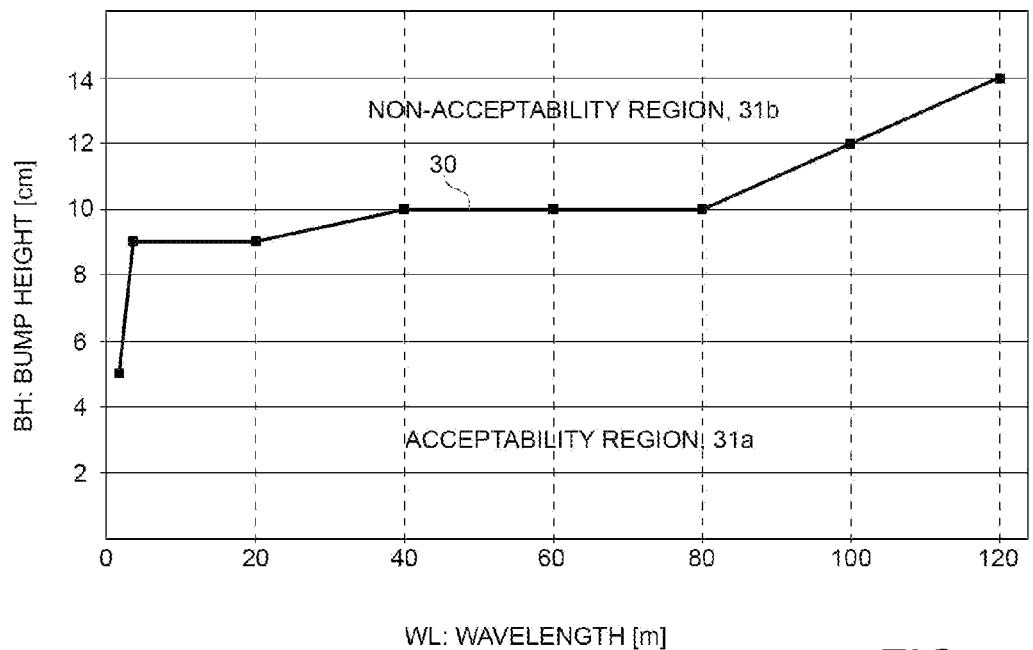
FIG. 5 shows a curve with the maximum values of deviation (heights/depressions) of the bumps/dips at each wavelength/roughness length value that have been found compatible in terms of stress induced on the overall structure of the aircraft through dynamic analysis of the taxiing performed for all the aircraft's permitted configurations, in terms of weight, centring and all taxiing speeds (the curve represents the upper acceptability limit of deviations for which the design limit loads are not exceeded in any point of the aircraft)

The thus obtained pairs of values WL-BH are used to generate a limit curve 30 of the type shown, by way of example, in FIG. 5.

The limit curve 30 in FIG. 5 has been generated with special reference to a regional turboprop aircraft and shows the maximum roughness height tolerated for each wavelength value WL (or roughness length BL≈WL/2 as a first approximation) prior to the structural design limit load values being exceeded on a certain (any) element/portion of the aircraft.

For example, considering a roughness with wavelength WL equal to approximately 20 m, the maximum height BH that can be structurally tolerated with the above-indicated criterion is approximately 9 cm.

In one embodiment of the present invention, the limit curve 30 in FIG. 5 is used to define a boundary between an acceptability region 31a and a non-acceptability region 31b. The acceptability region 31a comprises, for each wavelength value WL considered (or equivalent bump/dip length BL), elevation (or height) values below the maximum value that causes the structural design limit loads to be exceeded in a certain (any) portion of the aircraft (with possible consequent structural damage to the aircraft). The non-acceptability region 31*b* comprises, for each wavelength value WL considered (or equivalent bump/dip length BL), elevation (or height) values above the maximum value that causes the structural design limit loads to be exceeded in some point of the aircraft, in a certain (any) portion of the aircraft (with possible consequent structural damage to the aircraft).

Figure 6:
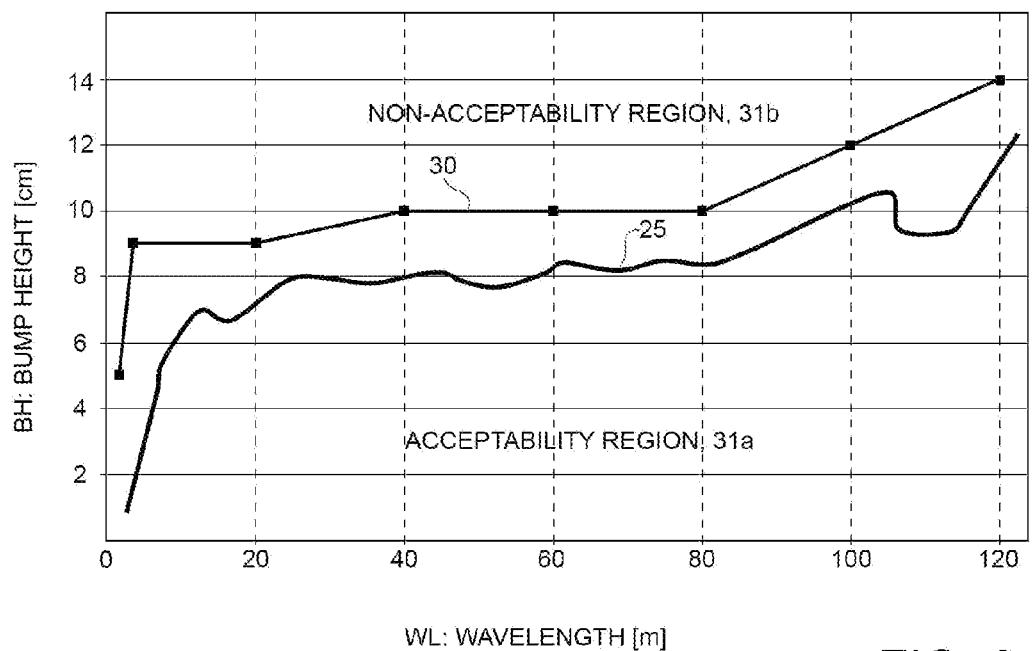
FIG. 6 shows the curves of FIGS. 4 and 5 compared to each other.

FIG. 6 shows the curve 25 of FIG. 4 and the limit curve 30 of FIG. 5 represented in a same Cartesian reference system, with a same scale of values, so that the two curves 25 and 30 can be compared with each other. As can be seen, curve 25, regarding the runway the compatibility of which is to be evaluated for use by the aircraft 2 considered, develops entirely within the acceptability region 31*a* delimited by the area subtended by the limit curve 30; i.e. for each wavelength value WL considered, the maximum acceptable roughness height value BH (limit curve 30) is greater than the respective BH value exhibited by the runway considered (curve 25) for that wavelength value WL.

With reference to FIG. 8, the PSD reference curve 60 for the aircraft 2 is, instead, chosen with reference to a PSD curve (in particular, a linearized one) of a real, previously examined runway. Alternatively, the PSD reference curve 60 could be generated for a reference runway that does not exist (for example, a virtual runway created by means of simulation software). Independently of the fact that the reference runway is real or virtual, the reference PSD curve is generated on the basis of dynamic taxiing analysis of the aircraft 2 in all the possible configurations of mass (weight, centring and moments of inertia), taxiing speed, boundary conditions (friction, aerodynamics, etc.) and direction of travel (one way and the other, as the stresses generated on encountering the roughnesses in one direction or in other are different), and for which it has been found that at no point of the aircraft 2 are the maximum values reached by the loads greater than the structural design limit values, even if the values reached by the loads in one or more points could be close to these limit values. In practice, such analysis effectively corresponds to the analysis that would normally have to be carried out every time it is wished to establish the compatibility of an aircraft having known structural resistance characteristics for use on a new rough runway.

As shown in FIG. 8, the thus obtained PSD reference curve 60 defines regions (or zones) of compatibility 61*a* and incompatibility 61*b* when a curve, obtained through PSD analysis of a new runway for which verification of compatibility for use by a given aircraft is required, is compared with it (in this example, curve 62 of FIG. 9). If the PSD curve 62 of the new runway extends entirely within the acceptability region 61*a* subtended by the PSD reference curve 60, this means that the frequency content of its roughnesses is such as not to cause structural damage to the aircraft 2 or parts thereof. Vice versa, if the PSD curve 62 of the new runway extends entirely or partially within the non-acceptability region 61*b*, this means that the frequency content of its roughnesses could cause structural damage to the aircraft 2 or parts thereof (for example, because the aircraft 2 or parts thereof are stressed at its/their frequency of resonance).

It is evident that the choice of reference runway for defining the PSD reference curve 60 is arbitrary and depends on the level of conservativeness that the manufacturer of the aircraft wishes to ensure: that which is considered most appropriate according to the state of project and/or current engineering knowledge will be chosen; the PSD reference curve 60 can be changed or modified over time on the basis of the maturity of the project for the aircraft and all the knowledge acquired on the real behaviour of the aircraft's structure.

Then, a comparison is made between the PSD curves 62 of the runway for which it is necessary to establish compatibility with the aircraft 2 considered, and the PSD reference curve 60 of the runway taken as the reference runway for the aircraft 2.

Figure 10:
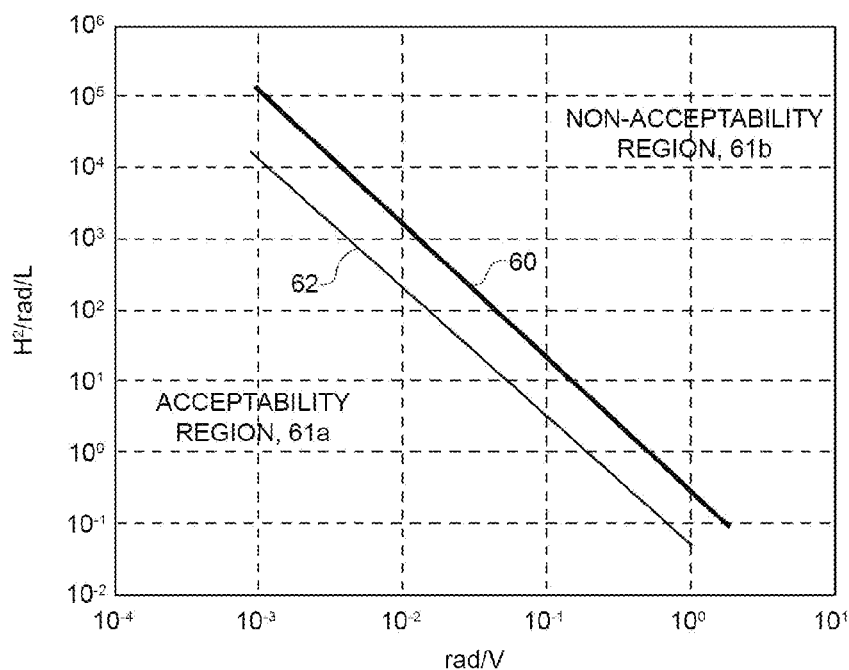
FIG. 10 shows the curves in FIGS. 8 and 9 compared to each other.

If the situation illustrated in FIG. 10 occurs, where the PSD curve 62 extends entirely within the acceptability region 61*a* subtended by the PSD reference curve 60, then the runway that is being evaluated is compatible with being used by the aircraft 2. Vice versa, if the PSD curve 62 extends entirely or partially within the non-acceptability region 61*b* (i.e. has one or more values on the axis of ordinates greater than the respective one or more values taken, on the same axis, by the PSD reference curve 60), then the runway that is being evaluated might not be compatible for being used by the aircraft 2. In this case, further analysis, not the subject of the present invention, is opportune.

Figure 11:
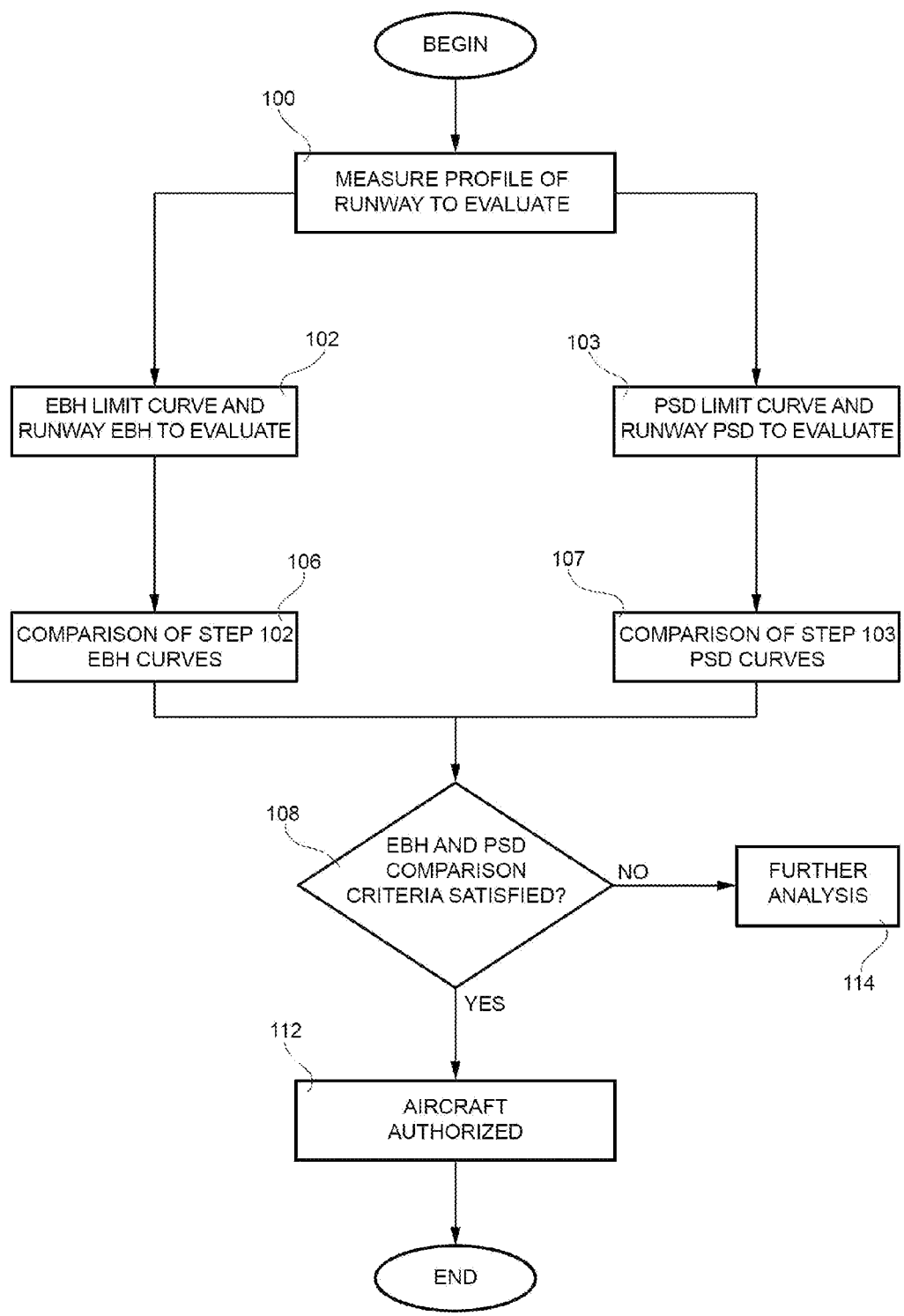
FIG. 11 shows, by means of a flowchart, the steps of the evaluation method according to one embodiment of the present invention.

FIG. 11 shows the steps of the method according to the present invention, according to one embodiment, by means of a flowchart.

First of all, in step 100, the profile of the runway is acquired for which it is wished to evaluate compatibility for being used by a given aircraft. Step 100 can be omitted in the case where a profile of the runway of interest is already available; for example, acquired on a previous occasion, or acquired from a party other than the designer/developer of the aircraft 2.

The profile of the runway is obtained through measurement in the field, as previously described. Alternatively, the runway profile can also be deduced from a specific bibliography, such as, for example, NASA TN reports D-5444, D-5545, D-5703 and D-6567 (publicly available).

Then, in step 102, an equivalent bump height curve (EBH) is determined for the runway considered (curve 25, as described with reference to FIG. 4) and an EBH limit curve regarding the aircraft considered (limit curve 30, as described with reference to FIG. 5). The equivalent bump height curve 25 for the runway is obtained, for example, by using the "Boeing Method" as illustrated in FIGS. 3*a*-3*c* and described with reference to these figures. The EBH limit curve 30 regarding the aircraft 2 considered is obtained by determining the maximum bump heights for which the aircraft 2 remains within the envelope of admissible loads.

The curves 25 and 30 obtained in step 102 are then compared with each other, in step 106 and FIG. 6, to determine whether the EBH curve 25 regarding the runway to be evaluated develops entirely within the acceptability region 31*a* defined by the EBH limit curve 30 obtained for the aircraft 2 considered.

Step 106 thus comprises comparing equivalent bump height curve 25 with equivalent bump height curve 30. Equivalent bump height curve 30 is indicative of elevation and/or depression limit values of reference roughnesses such that, when the aircraft 2 encounters said reference roughnesses, the stresses transferred to the structure of the aircraft and/or parts of the structure and/or parts of the aircraft are less than a first admissible limit load. The admissible limit load corresponds to a first safety threshold, in which the structural integrity of the aircraft or parts thereof is guaranteed. In other words, the stresses transferred to the structure of the aircraft remain within the envelope of admissible limit loads.

With reference to step 103, based on the profile of runway as per step 100, a power spectral density (PSD) computational operation is performed, considering the profile of the runway, as per step 100, as a generic random statistical signal (curve 62, as described with reference to FIG. 9). A similar power spectral density computational operation is performed with reference to a profile of a runway taken as the limit (or reference) runway for the aircraft 2 in question, i.e. one having roughnesses with characteristics such that the aircraft remains within the envelope of admissible loads (curve 60, as described with reference to FIG. 8).

The thus obtained PSD curves 62 and 60, one regarding the runway to be evaluated and the other regarding a reference runway, are then compared with each other, in step 107 and FIG. 10, to check if the PSD curve 62 regarding the runway to be evaluated develops entirely within the acceptability region 61*a* defined by the PSD curve 60 regarding the reference runway.

In particular, step 107 comprises comparing power spectral density curve 62 with power spectral density curve 60, regarding a profile of a reference runway such that when the aircraft 2 travels along the reference runway, the stresses transferred to the structure of the aircraft and/or parts of the structure and/or parts of the aircraft, are less than a second admissible limit load. The admissible limit load corresponds to a second safety threshold, in which the structural integrity of the aircraft or parts thereof is guaranteed. In other words, the stresses transferred to the structure of the aircraft remain within the envelope of admissible limit loads.

Processing then continues in step 108 by checking the results of comparison as per steps 106 and 107. In the case where both EBH curve 25 and PSD curve 62 regarding the runway to be evaluated develop entirely within the respective acceptability regions 31*a* and 61*a* of the respective reference curves 30 and 60, then the YES exit is taken from step 108, and the aircraft 2 in question (or parts thereof) will not sustain damage deriving directly from taxiing on the runway, the profile of which is obtained in step 100, and is authorized to taxi on this runway (step 112); vice versa, the NO exist is taken from step 108 and further checks are necessary (step 114, these further checks are not part of the present invention).

It is clear that the generation of EBH curve 30 as per step 102 and FIG. 5, and the generation of PSD curve 60 of reference runway as per step 103 and FIG. 8, are only performed once and not on each iteration of the steps of the method in FIG. 11. Following structural modifications to the aircraft 2, one or both of steps 102 and 103 are performed again, if considered necessary.

Figure 12:
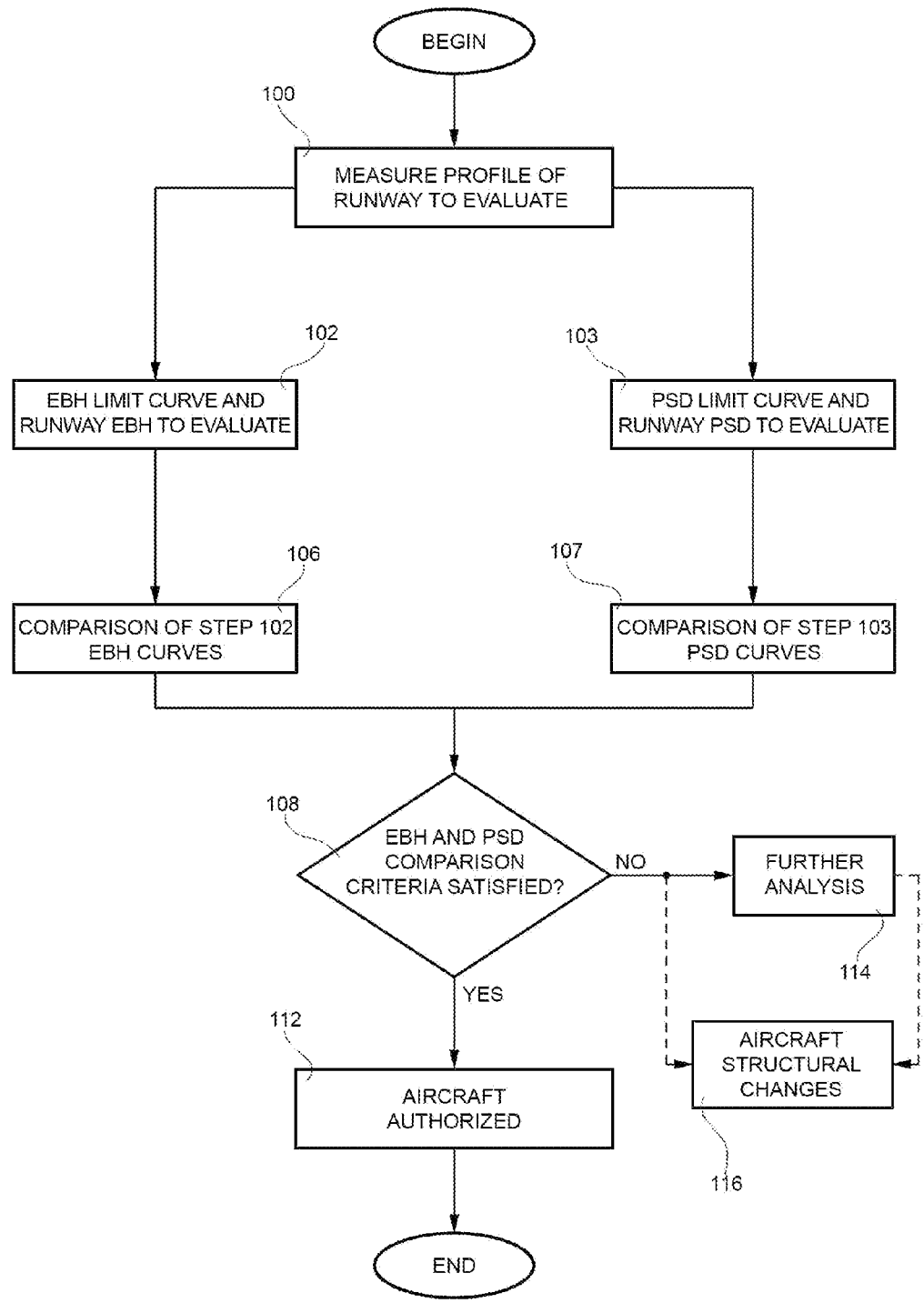
FIG. 12 shows, by means of a flowchart, the steps of the evaluation method according to a further embodiment of the present invention.

FIG. 12 shows the steps of a method according to a further embodiment of the present invention. Steps 100-114 of FIG. 12 correspond to steps 100-114 of FIG. 11, respectively, and are not described again. According to the embodiment in FIG. 12, in alternative to or following step 114 (as indicated by the mutually alternative dashed arrows), a step 116 is provided for structural changes to the aircraft 2. On the basis of the results of steps 106 and/or 107, it is in fact possible to make structural changes to the aircraft in order to make it suitable for taxiing operations on the runway considered. As a consequence of steps 100-107 in FIG. 12, an indication is generated on how to change the project specifications of the aircraft 2 considered, to make it compatible with the use intended for the aircraft 2. These changes can be carried out by a skilled person or be automated. For example, step 107 for comparing the PSD curves could supply information regarding which frequencies are deleterious for certain structures of the aircraft. It is therefore possible to change the materials and/or shapes and/or other parameters of these structures so that they become immune to these frequencies. This step can be carried out automatically by means of opportune software that iteratively makes changes to the aircraft considered, until the comparison criteria of steps 106 and 107 are satisfied.

According to the present invention it is therefore possible provide compatibly to determine the compatibility of a new runway for use by an aircraft on the basis of the construction of the EBH (curve 25 in FIG. 4) and PSD (curve 62 in FIG. 9) curves, which are obtained on the basis of processing the geometric profile of the runway considered, and their comparison with the analogous EBH (curve 30 in FIG. 5) and PSD (curve 60 in FIG. 8) curves taken as a reference for the aircraft. If both curves 25 and 62 of the runway fall in the respective acceptability areas 31*a* and 61*a* of the respective reference curves 30 and 60, then further dynamic taxiing analysis of the aircraft 2 on the new runway for still further compatibility evaluation is unnecessary, with consequent advantages that are considerable in terms of response times and costs.

The method according to the present invention, in the embodiments in FIGS. 11 and 12, permits distinctive characterization of the structural capabilities of any aircraft, to enable rapid evaluation of its operability on unpaved runways for which the profile has been measured (as in step 100).

Figure 13:
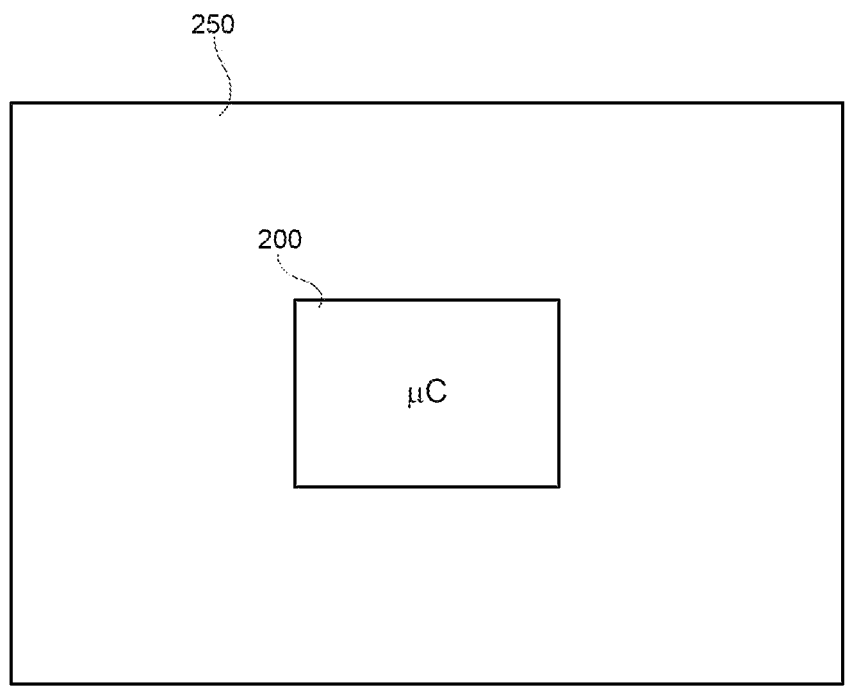
FIG. 13 shows a computer system suitable for implementing the evaluation method in FIG. 11 or 12.

With reference to FIG. 13, the method according to the present invention (in any of the embodiments in FIG. 11 or 12) can be developed as a computer program, loadable on generic processing means 200 (including, for example, a memory and a microprocessor, or an industrial digital signal processor (DSP), or still other processing means). The processing means 200 are part of an aircraft design/development station 250 (comprising, for example, one or more personal computers). According to one embodiment, the processing means 200 receives as input: the profile of the runway to analyse; the EBH limit curve of the aircraft; and the linearized PSD curve of the reference runway. According to the same embodiment, the processing means 200 generates as output: the EBH and PSD curves of the runway to be evaluated; a result of the comparison between the EBH curve of the runway to be evaluated and the EBH curve obtained for the aircraft; and a result of the comparison between the PSD curve of the runway to be evaluated and the linearized PSD curve of the reference runway.

According to a further embodiment, the processing means 200 also generate, as output, structural changes for the aircraft considered, as described with reference to step 116 of FIG. 12.

The present invention also relates to a computer program, loadable in processing means 200 and designed so that, when executed, the processing means become configured to perform the method according to any of the embodiments of the present invention.

From what has been described, it is evident that the method according to the present invention represents a significant evolution with respect to that described in the literature and known in the state of the art. In fact, according to the known technique, the generation of the limit curves in terms of "roughness height" with respect to "roughness length" (or Bump Height vs. Bump Length), is aimed at the definition of the level of runway asperities/surface roughness that is generally acceptable for all commercial aircraft (for purposes of comfort and increasing the fatigue life of the structure and undercarriage). The known art is thus essentially aimed at providing a standard for airport authorities to check the state of maintenance of the runways.

Conversely, the method according to the present invention is aimed at characterizing an aircraft, defining its intrinsic structural capability for use (taxiing/take-off/landing) on unpaved runways, provided that the evaluated surface profile falls within the acceptability area of the specially provided diagrams, as illustrated in FIGS. 6 and 10. In this case, the structural compatibility of the aircraft for use of the runway is guaranteed. However, the aircraft manufacturer has, in any case, the widest decisional flexibility in defining the most appropriate level of structural capability for authorizing the use of unpaved runways, as a function of the residual margins available and, more in general, the conservative criteria of the manufacturer's technological know-how regarding project safety. In this sense, it should be underlined how the method according to the present invention is not intended to substitute the common practice of complete dynamic simulation analysis of taxiing on the runway profile to determine the level of loads over the whole of the aircraft. In fact, if the result of the geometric processing of a new runway profile falls in the non-acceptability area of the diagrams in FIGS. 6 and 10, this does not exclude the possibility that complete dynamic analysis on this runway could instead result in compatibility for use. The present invention, by being configured as a preventive evaluation, has the advantage of being rapid and reliable.

The method according to the present invention for evaluating the structural compatibility of an aircraft for use on unpaved runways permits a considerable reduction in design engineering response times to requests from airline companies for extending the operability of new aircraft or those already in service to using airports with unpaved runways, in this way aiding an increase in the number of routes that can be covered. More in general, this procedure can also be a valid aid in the design phases to support analysis aimed at evaluating the commercial appeal of a new product, increasing its market penetration capabilities.

Finally, it is clear that modifications and variants can be made to the invention described and illustrated herein without leaving the scope of protection of the present invention, as defined in the appended claims.

The invention claimed is:

1. A method for evaluating the structural compatibility of an aircraft (2) for use on a runway (5) having a profile with one or more roughnesses (7, 8) in the form of bumps and/or dips using a computer-based system, comprising the steps of:

generating (102) by said system a first equivalent bump height curve (25) indicative of the elevation and/or depression of the one of more roughnesses (7, 8) of the runway (5) with respect to a reference value;

comparing (106) by said system the first equivalent bump height curve (25) with a second equivalent bump height curve (30) indicative of elevation and/or depression limit values of reference roughnesses such that, when the aircraft (2) encounters said reference roughnesses, the stresses transferred to the structure of the aircraft or parts thereof are lower than a first acceptable limit load, the second equivalent bump height curve moreover defining a first acceptability region (31*a*) and a first non-acceptability region (31*b*) of said stresses transferred when the aircraft (2) encounters said reference roughnesses;

generating (103) by the system a first power spectral density curve (62) using a spectral analysis of the profile of the runway (5);

comparing (107) by the system the first power spectral density curve (62) with a second power spectral density curve (60) relating to a profile of a reference runway such that, when the aircraft (2) runs along said reference runway, the stresses transferred to the structure of the aircraft or parts thereof are lower than a second admissible limit load, the second power spectral density curve (60) moreover defining a second acceptability region (61*a*) and a second non-acceptability region (61*b*) of said stresses transferred when the aircraft (2) runs along the reference runway;

verifying (108) by the system if the first equivalent bump height curve (25) develops entirely within the first acceptability region and if the first power spectral density curve (62) develops entirely within the second acceptability region; and authorizing or denying (112, 114, 116) by the system the aircraft (2) the use of the runway (5) on the basis of the result of said step of verifying (108).

2. The method according to claim 1, further comprising the steps of:

acquiring (100) with the system the profile of said runway (5) by measuring, on the centre line of the runway (5), elevation and/or depression values of one or more roughnesses (7, 8) of the runway (5) at measurement points spaced from one another by a respective predetermined amount (i); and determining (102) by the system, on the basis of the acquired profile (100), the first equivalent bump height curve (25).

3. The method according to claim 2, wherein the step of generating the first bump height curve (25) by the system comprises iteratively performing the steps of:

representing, in a spatial coordinate system, the profile (12) of a first runway (5) so that elevation/depression values of one or more roughnesses (7, 8) of the first runway (5) are associated with the axis of ordinates, and an extension of the first runway (5) defined by the sequence of said measurement points is associated with the axis of abscissas;

generating a virtual straightedge by said system between a first and a second point (A, B; B') belonging to the profile (12) of the first runway (5);

defining a third point (C; C'), belonging to the profile (12) of the first runway (5), comprised between the first and the second point (A, B; B');

associating by the system an equivalent bump height value (BH1; BH2; BH3) with a distance, measured on said axis of ordinates, between the virtual straightedge and the third point (C; C');

associating by the system an equivalent bump wavelength value (WL1; WL2; WL3) with an extension of the virtual straightedge measured on said axis of abscissas;

associating by the system the equivalent bump height value (BH1; BH2; BH3) with the equivalent bump wavelength value (WL1; WL2; WL3).

4. The method according to claim 3, wherein the second bump height curve (30) develops in a first system of equivalent spatial coordinates defined by an axis of ordinates associated with said equivalent bump height value (BH1; BH2; BH3) and an axis of abscissas associated with said equivalent bump wavelength value (WL1; WL2; WL3), the first acceptability region of the admissible loads comprising an area of the system of equivalent spatial coordinates subtended by the second bump height curve (30), and the first non-acceptability region of the admissible loads comprising regions of the system of equivalent spatial coordinates not subtended by the second bump height curve (30).

5. The method according to claim 1, wherein the step of authorizing (112) is only performed if the first equivalent bump height curve (25) develops entirely within the first acceptability region (31*a*) and if the first power spectral density curve (62) develops entirely within the second acceptability region (61*a*).

6. The method according to claim 1, comprising, after said step of denying (116), the step of modifying one or more structural elements of said aircraft (2) so that the first equivalent bump height curve (25) develops entirely within the first acceptability region (31*a*) and/or the first power spectral density curve (62) develops entirely within the second acceptability region (61*a*).

7. The method according to claim 1, further comprising the step of generating (102) by the system the second equivalent bump height curve (30), including the step of iteratively performing dynamic taxiing analysis of the aircraft (2) on a reference runway that comprises, at every iteration, a single reference roughness selected between bump or dip, represented with a sinusoidal curve and having a respective wavelength (WL) value and bump height (BH) elevation value or dip depression value.

8. The method according to claim 7, wherein the step of performing the dynamic taxiing analysis by the system further comprises, for each considered reference roughness, the step of increasing the bump height (BH) elevation value or dip depression value, up to a limit value at which the aircraft (2), or selective portions of said elevation value or depression value, reaches a maximum limit value of the first and/or a second admissible load.

9. The method according to claim 1, further comprising the step of generating (103) the second power spectral density curve (60) by means of power spectral density analysis of an ideal runway selected as a reference and such that the maximum values drawn by the loads have been found to be lower than the structural design limit values of the aircraft (2), or lower than a load level defined as the limit value to ensure safety in terms of structural integrity of the aircraft or portions thereof.

10. The method according to claim 1, wherein the second power spectral density curve (60) is represented in a Cartesian system, the second acceptability region of the admissible loads comprising an area of the Cartesian system subtended by the second power spectral density curve (60), and the second non-acceptability region of the admissible loads comprising an area of the Cartesian system other than the area subtended by the second power spectral density curve (60).

* * * * *